United States Patent
Baselga et al.

(10) Patent No.: US 11,756,000 B2
(45) Date of Patent: Sep. 12, 2023

(54) SYSTEMS AND METHODS TO EFFECTUATE SETS OF AUTOMATED ACTIONS WITHIN A COLLABORATION ENVIRONMENT INCLUDING EMBEDDED THIRD-PARTY CONTENT BASED ON TRIGGER EVENTS

(71) Applicant: Asana, Inc., San Francisco, CA (US)

(72) Inventors: Marc Baselga, New York, NY (US); Adam Clayton Butler, El Cerrito, CA (US); Cvetomir Ivanov Cankov, Round Rock, TX (US); Elden Lane Seropian, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 2 days.

(21) Appl. No.: 17/469,210

(22) Filed: Sep. 8, 2021

(65) Prior Publication Data
US 2023/0076595 A1    Mar. 9, 2023

(51) Int. Cl.
*G06Q 10/10*     (2023.01)
*G06Q 10/101*    (2023.01)
(Continued)

(52) U.S. Cl.
CPC ........... *G06Q 10/103* (2013.01); *G06F 9/451* (2018.02); *G06Q 10/101* (2013.01);
(Continued)

(58) Field of Classification Search
CPC .. G06Q 10/103; G06Q 10/101; G06Q 10/107; G06Q 10/1093; G06Q 30/04; G06F 9/451; G06F 3/04847
See application file for complete search history.

(56) References Cited

U.S. PATENT DOCUMENTS 5,233,687 A    8/1993  Henderson, Jr.
5,524,077 A    6/1996  Faaland
(Continued)

FOREIGN PATENT DOCUMENTS

CN    101305350 A    11/2008
CN    101563671 A    10/2009
(Continued)

OTHER PUBLICATIONS

Creating Tables with Fields from 2 Different Tables, published: 2009, publisher: SlackOverflow, pp. 1-2. (Year: 2009).
(Continued)

*Primary Examiner* — Daniel W Parcher
(74) *Attorney, Agent, or Firm* — ESPLIN & ASSOCIATES, PC

(57) ABSTRACT

Systems and methods for effectuating sets of automated actions within a collaboration environment including embedded third-party content based on trigger events are disclosed. Exemplary implementations may: manage environment state information maintaining a collaboration environment; generate automation information based on user entry and/or selection of the automation information into a user interface; detect occurrence of trigger events based on changes in values of parameters; responsive to the detection of the occurrence of trigger events, effectuate individual sets of automated actions; and/or perform other operations.

18 Claims, 5 Drawing Sheets

(51) Int. Cl.
*G06F 9/451* (2018.01)
*G06F 3/04847* (2022.01)
*G06Q 10/1093* (2023.01)
G06Q 30/04 (2012.01)
G06Q 10/107 (2023.01)

(52) U.S. Cl.
CPC ....... *G06F 3/04847* (2013.01); *G06Q 10/107* (2013.01); *G06Q 10/1093* (2013.01); *G06Q 30/04* (2013.01)

(56) References Cited

U.S. PATENT DOCUMENTS

| | | | |
|---|---|---|---|
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |
| 6,332,147 | B1 | 12/2001 | Moran |
| 6,385,639 | B1 | 5/2002 | Togawa |
| 6,621,505 | B1 | 9/2003 | Beauchamp |
| 6,629,081 | B1 | 9/2003 | Cornelius |
| 6,769,013 | B2 | 7/2004 | Frees |
| 6,859,523 | B1 | 2/2005 | Jilk |
| 7,020,697 | B1 | 3/2006 | Goodman |
| 7,039,596 | B1 | 5/2006 | Lu |
| 7,086,062 | B1 | 8/2006 | Faour |
| 7,349,920 | B1 | 3/2008 | Feinberg |
| 7,418,482 | B1 | 8/2008 | Lusher |
| 7,428,723 | B2 | 9/2008 | Greene |
| 7,640,511 | B1 | 12/2009 | Keel |
| 7,676,542 | B2 | 3/2010 | Moser |
| 7,779,039 | B2 | 8/2010 | Weissman |
| 7,779,053 | B2 | 8/2010 | Beck |
| 7,805,327 | B1 | 9/2010 | Schulz |
| RE41,848 | E | 10/2010 | Daniell |
| 7,917,855 | B1 | 3/2011 | Satish |
| 7,996,744 | B2 | 8/2011 | Ojala |
| 7,996,774 | B1 | 8/2011 | Sidenur |
| 8,214,747 | B1 | 7/2012 | Yankovich |
| 8,314,809 | B1 | 11/2012 | Grabowski |
| 8,499,300 | B2 | 7/2013 | Zimberg |
| 8,522,240 | B1 | 8/2013 | Merwarth |
| 8,527,287 | B1 | 9/2013 | Bhatia |
| 8,554,832 | B1 | 10/2013 | Moskovitz |
| 8,572,477 | B1 | 10/2013 | Moskovitz |
| 8,627,199 | B1 | 1/2014 | Handley |
| 8,639,552 | B1 | 1/2014 | Chen |
| 8,768,751 | B2 | 7/2014 | Jakowski |
| 8,831,879 | B2 | 9/2014 | Stamm |
| 8,843,832 | B2 | 9/2014 | Frields |
| 8,863,021 | B1 | 10/2014 | Bee |
| 9,009,096 | B2 | 4/2015 | Pinckney |
| 9,024,752 | B2 | 5/2015 | Tumayan |
| 9,143,839 | B2 | 9/2015 | Reisman |
| 9,152,668 | B1 | 10/2015 | Moskovitz |
| 9,201,952 | B1 | 12/2015 | Chau |
| 9,208,262 | B2 | 12/2015 | Bechtel |
| 9,251,484 | B2 | 2/2016 | Cantor |
| 9,350,560 | B2 | 5/2016 | Hupfer |
| 9,383,917 | B2 | 7/2016 | Mouton |
| 9,405,532 | B1 | 8/2016 | Sullivan |
| 9,405,810 | B2 | 8/2016 | Smith |
| 9,454,623 | B1 | 9/2016 | Kaptsan |
| 9,491,249 | B2 | 11/2016 | Rosenshine |
| 9,514,424 | B2 | 12/2016 | Kleinbart |
| 9,565,246 | B1 | 2/2017 | Tsypliaev |
| 9,600,136 | B1 | 3/2017 | Yang |
| 9,674,361 | B2 | 6/2017 | Ristock |
| 9,712,576 | B1 | 7/2017 | Gill |
| 9,785,445 | B2 | 10/2017 | Mitsui |
| 9,830,398 | B2 | 11/2017 | Schneider |
| 9,842,312 | B1 | 12/2017 | Rosati |
| 9,949,681 | B2 | 4/2018 | Badenes |
| 9,953,282 | B2 | 4/2018 | Shaouy |
| 9,959,420 | B2 | 5/2018 | Kiang |
| 9,978,040 | B2 | 5/2018 | Lee |
| 9,990,636 | B1 | 6/2018 | Lewis |
| 10,001,911 | B2 | 6/2018 | Breedvelt-Schouten |
| 10,003,693 | B2 | 6/2018 | Wolthuis |
| 10,083,412 | B2 | 9/2018 | Suntinger |
| 10,157,355 | B2 | 12/2018 | Johnson |
| 10,192,181 | B2 | 1/2019 | Katkar |
| 10,235,156 | B2 | 3/2019 | Johnson |
| 10,264,067 | B2 | 4/2019 | Subramani |
| 10,308,992 | B2 | 6/2019 | Chauvin |
| 10,373,084 | B2 | 8/2019 | Kurjanowicz |
| 10,373,090 | B2 | 8/2019 | Holm |
| 10,382,501 | B2 | 8/2019 | Malatesha |
| 10,455,011 | B2 | 10/2019 | Kendall |
| 10,496,943 | B2 | 12/2019 | De |
| 10,594,788 | B2 | 3/2020 | Larabie-Belanger |
| 10,606,859 | B2 | 3/2020 | Smith |
| 10,613,735 | B1 | 4/2020 | Karpe |
| 10,616,151 | B1 | 4/2020 | Cameron |
| 10,623,359 | B1 | 4/2020 | Rosenstein |
| 10,671,692 | B2 | 6/2020 | Koopman |
| 10,684,870 | B1 | 6/2020 | Sabo |
| 10,706,484 | B1 | 7/2020 | Murnock |
| 10,785,046 | B1 | 9/2020 | Raghavan |
| 10,810,222 | B2 | 10/2020 | Koch |
| 10,846,105 | B2 | 11/2020 | Granot |
| 10,846,297 | B2 | 11/2020 | Smith |
| 10,922,104 | B2 | 2/2021 | Sabo |
| 10,956,845 | B1 | 3/2021 | Sabo |
| 10,970,299 | B2 | 4/2021 | Smith |
| 10,977,434 | B2 | 4/2021 | Pelz |
| 10,983,685 | B2 | 4/2021 | Karpe |
| 11,082,281 | B2 | 8/2021 | Justin |
| 11,095,468 | B1 | 8/2021 | Pandey |
| 11,113,667 | B1 | 9/2021 | Jiang |
| 11,138,021 | B1 | 10/2021 | Rosenstein |
| 11,140,174 | B2 | 10/2021 | Patel |
| 11,204,683 | B1 | 12/2021 | Sabo |
| 11,212,242 | B2 | 12/2021 | Cameron |
| 11,263,228 | B2 | 3/2022 | Koch |
| 11,288,081 | B2 | 3/2022 | Sabo |
| 11,290,296 | B2 | 3/2022 | Raghavan |
| 11,327,645 | B2 | 5/2022 | Karpe |
| 11,341,444 | B2 | 5/2022 | Sabo |
| 11,341,445 | B1 | 5/2022 | Cheng |
| 2002/0065798 | A1 | 5/2002 | Bostleman |
| 2002/0082889 | A1 | 6/2002 | Oliver |
| 2002/0143594 | A1 | 10/2002 | Kroeger |
| 2003/0028595 | A1 | 2/2003 | Vogt |
| 2003/0036934 | A1 | 2/2003 | Ouchi |
| 2003/0041317 | A1 | 2/2003 | Sokolov |
| 2003/0097406 | A1 | 5/2003 | Stafford |
| 2003/0097410 | A1 | 5/2003 | Atkins |
| 2003/0126001 | A1 | 7/2003 | Northcutt |
| 2003/0200223 | A1 | 10/2003 | Hack |
| 2003/0225598 | A1 | 12/2003 | Yu |
| 2003/0233265 | A1 | 12/2003 | Lee |
| 2003/0233268 | A1 | 12/2003 | Taqbeem |
| 2004/0030992 | A1 | 2/2004 | Moisa |
| 2004/0083448 | A1 | 4/2004 | Schulz |
| 2004/0093290 | A1 | 5/2004 | Doss |
| 2004/0093351 | A1 | 5/2004 | Lee |
| 2004/0098291 | A1 | 5/2004 | Newburn |
| 2004/0125150 | A1 | 7/2004 | Adcock |
| 2004/0162833 | A1 | 8/2004 | Jones |
| 2004/0187089 | A1 | 9/2004 | Schulz |
| 2004/0207249 | A1 | 10/2004 | Baumgartner |
| 2004/0230447 | A1 | 11/2004 | Schwerin-Wenzel |
| 2004/0268451 | A1 | 12/2004 | Robbin |
| 2005/0210394 | A1 | 9/2005 | Crandall |
| 2005/0216111 | A1 | 9/2005 | Ooshima |
| 2005/0222971 | A1 | 10/2005 | Cary |
| 2006/0028917 | A1 | 2/2006 | Wigginton |
| 2006/0047454 | A1 | 3/2006 | Tamaki |

(56) References Cited

U.S. PATENT DOCUMENTS

| | | |
|---|---|---|
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen, III |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0245300 A1 | 10/2007 | Chan |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0005235 A1 | 1/2008 | Hegde |
| 2008/0033777 A1 | 2/2008 | Shukoor |
| 2008/0046471 A1 | 2/2008 | Moore |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0120129 A1 | 5/2008 | Seubert |
| 2008/0126930 A1 | 5/2008 | Scott |
| 2008/0126945 A1 | 5/2008 | Munkvold |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2008/0313595 A1 | 12/2008 | Boulineau |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2010/0005087 A1 | 1/2010 | Basco |
| 2010/0063860 A1 | 3/2010 | Gallion |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0107333 A1 | 5/2011 | Kapoor |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0018952 A1* | 1/2013 | McConnell ......... G06Q 10/101 709/204 |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |

(56) References Cited

U.S. PATENT DOCUMENTS

| | | |
|---|---|---|
| 2014/0012603 A1 | 1/2014 | Scanlon |
| 2014/0025767 A1 | 1/2014 | De Kezel |
| 2014/0036639 A1 | 2/2014 | Taber |
| 2014/0040780 A1 | 2/2014 | Brian |
| 2014/0040905 A1 | 2/2014 | Tadanobu |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1* | 8/2014 | Smith .......... G06Q 10/0633 705/7.27 |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1* | 11/2014 | Holm .......... G06Q 10/06316 705/7.26 |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0153906 A1 | 6/2015 | Liao |
| 2015/0213411 A1 | 7/2015 | Swanson |
| 2015/0215256 A1 | 7/2015 | Ghafourifar |
| 2015/0262111 A1 | 9/2015 | Yu |
| 2015/0312375 A1 | 10/2015 | Valey |
| 2015/0317595 A1 | 11/2015 | De |
| 2015/0339006 A1 | 11/2015 | Chaland |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0313934 A1 | 10/2016 | Isherwood |
| 2016/0328217 A1 | 11/2016 | Hagerty |
| 2016/0342927 A1 | 11/2016 | Reznik |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0223069 A1* | 8/2017 | Arora .......... G06F 3/04817 |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0344931 A1 | 11/2017 | Shenk |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0109421 A1 | 4/2018 | Youcef |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1 | 9/2018 | Beaudoin |
| 2018/0262620 A1 | 9/2018 | Wolthuis |
| 2018/0285471 A1 | 10/2018 | Hao |
| 2018/0316636 A1 | 11/2018 | Kamat |
| 2018/0331842 A1 | 11/2018 | Faulkner |
| 2018/0357049 A1 | 12/2018 | Epstein |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0213509 A1 | 7/2019 | Burleson |
| 2019/0265821 A1 | 8/2019 | Pearl |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |

(56) References Cited

U.S. PATENT DOCUMENTS

| | | |
|---|---|---|
| 2020/0059539 A1 | 2/2020 | Wang |
| 2020/0065736 A1 | 2/2020 | Relangi |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2020/0358628 A1* | 11/2020 | Achyuth .............. H04M 3/568 |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0182475 A1 | 6/2021 | Pelz |
| 2021/0216562 A1 | 7/2021 | Smith |
| 2021/0232282 A1 | 7/2021 | Karpe |
| 2021/0320891 A1 | 10/2021 | Rosenstein |
| 2021/0342786 A1 | 11/2021 | Jiang |
| 2021/0382734 A1 | 12/2021 | Rosenstein |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0207489 A1* | 6/2022 | Gupta .................... H04N 7/15 |
| 2022/0239516 A1* | 7/2022 | Iyer ................... H04L 12/1831 |

FOREIGN PATENT DOCUMENTS

| | | |
|---|---|---|
| CN | 101339642 B | 12/2011 |
| CN | 102378975 B | 5/2015 |
| WO | 2015036817 A1 | 3/2015 |
| WO | 2015123751 A1 | 8/2015 |
| WO | 2016033493 A1 | 3/2016 |
| WO | 2020006634 A1 | 1/2020 |

OTHER PUBLICATIONS

"Rules of Data Conversion from Document to Relational Databases", published: 2014, publisher: Future-processing, pp. 1-8 (Year: 2014).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, NY [New York, N.Y]Nov. 8, 2013 (Year: 2013) 4 pages.

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

"U.S. Appl. No. 14/584,750, Examiner Interview Summary dated Feb. 25, 2016", 3 pgs.

"U.S. Appl. No. 14/584,750, Non Final Office Action dated Aug. 28, 2015", 21 pgs.

"U.S. Appl. No. 14/584,750, Notice of Allowance dated Mar. 28, 2016", 8 pgs.

"U.S. Appl. No. 14/584,750, Response filed Feb. 29, 2015 to Non Final Office Action dated Aug. 28, 2015", 16 pgs.

"U.S. Appl. No. 14/584,850, Final Office Action dated Sep. 1, 2017", 31 pgs.

"U.S. Appl. No. 14/584,850, Non Final Office Action dated Jan. 10, 2017", 9 pgs.

"U.S. Appl. No. No. 14/584,850, Response filed Apr. 10, 2017 to Non Final Office Action dated Jan. 10, 2017", 13 pgs.

"How to Asana: Inviting teammates to Asana." YouTube, Asana, Mar. 21, 2017, https://www.youtube.com/watch?v=TLOruY1KyxU ( Year: 2017), 13 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov 16, 2016 https://www.youtube.com/watch?v=hBiQ7DJNinE (Year: 2016) (21 pages).

Asana Workload and Portfolios,youtube,excerpt, Aug. 1, 2019 https://www.youtube.com/watch?v=7XkNcFDG6M (Year: 2019) (20 pages).

Asana YouTube channel, list of all product videos, Nov. 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIbv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae5806232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

Hartmann, "TimeProjectscheduling with resource capacities and requests varying with time: a case study," 2013, Flexible services and manufacturing journal, vol. 25, No. 1, pp. 74-93 (Year: 2013).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv30 (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

(56) References Cited

OTHER PUBLICATIONS

How to use Advanced Search in Asana, Asana tutorial, May 25, 2016 https://www.youtube.com/watch?v=5VyJ3toPfQM (Year: 2016) (28 pages).
Justin Rosenstein, Unveiling the Future of Asana, Mar. 28, 2018 https://www.youtube.com/watch?v=nRl?d_WM4Bc (Year: 2018) (2 pages).
Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).
Paul Minors, How to automate your tasks, youtube excerpts, Oct. 18, 2019 https://www.youtube.com/watch?v=lwF9XyUQrzw (Year: 2019).
Prioritize My Tasks in Asana, Asana tutorial, youtube, excerpt, May 25, 2016 https://www.youtube.com/watch?v=UbCnMvw01nl (Year: 2016) (3 pages).
Project views, Asana tutorial, youtube, excerpt May 25, 2016 https://www.youtube.com/watch?v=FYjA8ZH3ceQ (Year: 2016) (5 pages).
Using Asana Premium, Asana tutorial, youtube, excerpt, Sep. 10, 2016 https://www.youtube.com/watch?v=vMgLtDDmyeo (Year: 2016) (4 pages).
Where does Asana fit in, archives org, Jul. 8, 2017 https://web.archive.org/web/20170708150928/https://asana.com/guide/resources/infosheets/where-does-asana-fit (Year: 2017) (5 pages).
www.cogmotive.com/blog/author/alan Alan Byrne: "Creating a company Shared Calendar in Office 365"; pp. 1-17; Sep. 10, 2013.
(Tiburca, Andrew) Best Team Calendar Applications for 2018-Toggl https://toggl.com/blog/best-team-calendar-applications-for-2018 (Year: 2017).
Macro, computer science, wikipedia, archives org Feb. 11, 2020 http://web.archive.org/web/20200211082902/https://en.wikipedia.org/wiki/Macro_(computer_science) (Year: 2020).
Lauren Labreoque, "Fostering Consumer-Brand Relationships in Social Media Environments: The Role of Parasocial Interaction", 2014, Journal of Interactive Markeing, 28 (2014), pp. 134-148 (Year: 2014).
Dawei Li, "Deepcham: Collaborative Edge-Mediated Adaptive Deep Learning for Mobile Object Recognition", 2016, IEEE/ACM, pp. 64-76. (Year: 2016).
Peter Wurman, "Coordinating Hundreds of Cooperative, Autonomous Vehicles in Warehouses," 2008, AI Magazine, vol. 29, No. 1, pp. 9-19. (Year: 2008).
Sara Perez-Soler, "Towards Conversational Syntax for Domain-Specific Languages using Chatbots", 2019, Journal of Object Technology, vol. 18, No. 2, pp. 5:1-21. (Year: 2019).

\* cited by examiner

SYSTEMS AND METHODS TO EFFECTUATE SETS OF AUTOMATED ACTIONS WITHIN A COLLABORATION ENVIRONMENT INCLUDING EMBEDDED THIRD-PARTY CONTENT BASED ON TRIGGER EVENTS

FIELD OF THE DISCLOSURE

The present disclosure relates to systems and methods to effectuate sets of automated actions within a collaboration environment including embedded third-party content based on trigger events, in particular, where the automated actions and/or trigger events are related to the embedded third-party content.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may include features and/or functionality that improves work efficiency integrated into a single easy-to-use and intuitive interface.

SUMMARY

Collaboration environments are often used in conjunction with third-party applications. For example, users may use a collaboration environment to create, assign, and/or manage work, while also carrying out actions such as calendaring events into a personal calendar, drafted and/or sending emails in an email application, sending direct personal messages over a messaging application, creating and sending physical or digital invoices, effectuating electronic payments, and/or other actions. Over time, the users may tend to follow patterns with how they use the collaboration environment and/or third-party applications. This may create a negative experience for users who may tire of potentially repetitive work. Requiring such repetitive manual interaction may increase friction within the collaboration environment and/or overall effectiveness of the collaboration environment to improve workflow.

One or more implementations of the systems and methods presented herein propose one or more solutions to ease friction that may be created between users and the collaboration environment and/or to allow for more efficient use of the collaboration environment. In some implementations, a collaboration environment may include third-party content embedded directly in the collaboration environment. In this manner, the third-party content may appear within a user interface of the collaboration environment so that the users may not have to switch between different application programs to get their work done. A server hosting the collaboration environment may store an instance of the third-party content within a record structure of the collaboration environment. The server hosting the collaboration environment and a server hosting the third-party content may communicate to keep the embedded instance of the third-party content up-to-date.

In some implementations, the systems and methods presented herein may create less friction and/or more efficient use of the collaboration environment including embedded third-party content by automatically effectuating actions in response to trigger events. The automated actions and/or trigger events may be user specified. The automated actions may target the embedded third-party content and/or locally hosted content of the collaboration environment. The trigger events may be derived from the embedded third-party content and/or locally hosted content of the collaboration environment.

One aspect of the present disclosure relates to a system configured to effectuate sets of automated actions within a collaboration environment based on trigger events. One or more implementations of the system may include one or more hardware processors configured by machine-readable instructions. The processor(s) may be configured to manage environment state information maintaining a collaboration environment. The collaboration environment may be configured to facilitate interaction by users with the collaboration environment. The environment state information may include values of environment parameters, embedded content parameters, and/or other information. The environment parameters may characterize one or more of the users of the collaboration environment, units of work managed, created, and/or assigned within the collaboration environment, and/or other content of the collaboration environment. The embedded content parameters may characterize third-party content embedded within the collaboration environment and/or other information.

The processor(s) may be configured to generate automation information and/or other information. The automation information may be generated based on user entry and/or selection of the automation information into a user interface. The automation information may specify sets of automated actions to carry out within the collaboration environment in response to occurrence of trigger events. In some implementations, the trigger events may be derived from the third-party content embedded within the collaboration environment and/or other information. In some implementations, an automated action to carry out within the collaboration environment may be an action made with respect to third-party content embedded within the collaboration environment. By way of non-limiting illustration, the automation information may specify a first set of automated actions to carry out within of the collaboration environment in response to a first trigger event. The first trigger event may be derived from third-party content embedded within the collaboration environment and/or content of the collaboration environment. The first set of automated actions may include an action targeted at the embedded third-party content and/or an action targeted at locally hosted content of the collaboration environment.

In some implementations, the processor(s) may be configured to detect occurrence of the trigger events from the third-party content embedded within the collaboration environment and/or other information. Trigger events derived from the third-party content embedded within the collaboration environment may be detected based on changes in the values of the embedded content parameters and/or other information. By way of non-limiting illustration, an occurrence of the first trigger event may be detected based on a first change in a first value of a first embedded content parameter to a second value.

In some implementations, the processor(s) may be configured to, responsive to the detection of the occurrence of the trigger events, effectuate the sets of automated actions within the collaboration environment. By way of non-limiting illustration, responsive to the detection of the first trigger event, the first set of automated actions may be effectuated within the collaboration environment.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
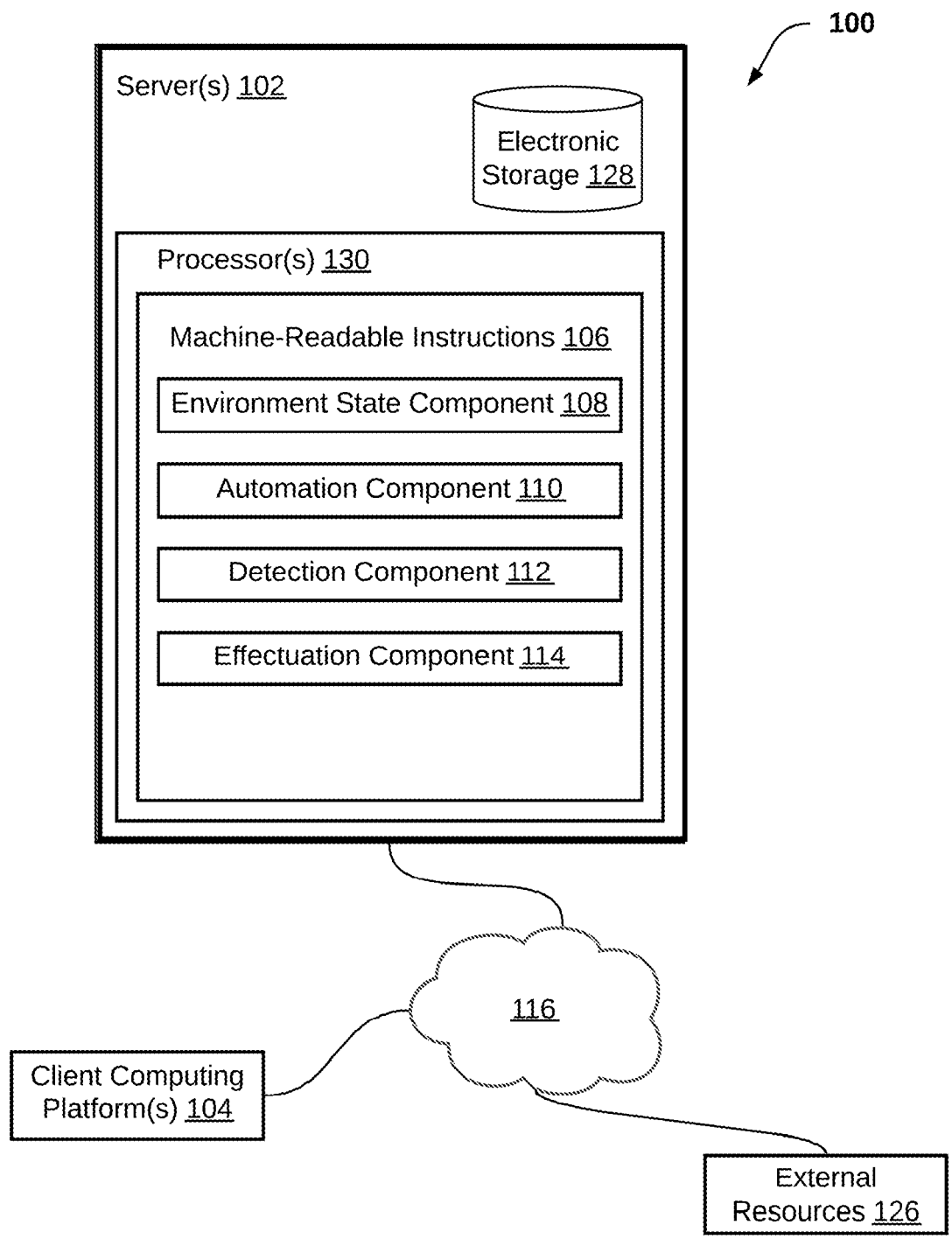
FIG. 1 illustrates a system configured to effectuate sets of automated actions within a collaboration environment including embedded third-party content based on trigger events, in accordance with one or more implementations.

FIG. 1 illustrates a system 100 configured to effectuate sets of automated actions within a collaboration environment including embedded third-party content based on trigger events. In some implementations, the collaboration environment may include third-party content embedded directly in the collaboration environment. In this manner, the third-party content may appear within a user interface of the collaboration environment so that the users may not have to continually switch between different application programs to get their work done. A server (e.g., servers(s) 102) hosting the collaboration environment may store an instance of the third-party content within a record structure of the collaboration environment. The server hosting the collaboration environment and a server hosting the features and/or functionality that generates the third-party content may communicate to keep the embedded instance of the third-party content up-to-date.

In some implementations, actions may be automatically carried out in response to trigger events in order to reduce the amount of manual interaction a user may typically do on a day-to-day basis. The automated actions and/or trigger events may be user specified. The automated actions may target the embedded third-party content and/or locally hosted content of the collaboration environment. "Locally" hosted may mean content that is local to the server(s) 102 hosting the collaboration environment and not necessarily local to the computing platforms of end-users being served the collaboration environment. The trigger events may be derived from the embedded third-party content and/or locally hosted content of the collaboration environment. In some implementations, system 100 may be configured to communicate with one or more external resources 126 such that individual external resources may communicate reports indicating the third-party content embedded in the collaboration environment has been updated, created, deleted, and/or otherwise changed.

In some implementations, system 100 may include one or more of one or more servers 102, one or more client computing platforms 104, one or more external resources 126, and/or other components. Server(s) 102 may be configured to communicate with one or more client computing platforms 104 and/or one or more external resources 126 according to a client/server architecture and/or other architectures. Client computing platform(s) 104 may be configured to communicate with other client computing platforms via server(s) 102 and/or according to a peer-to-peer architecture and/or other architectures. External resource(s) 126 may include sources of third-party content. Individual external resources may be referred to herein as third-party resources. By way of non-limiting illustration, individual third-party resources may include third-party servers that host third-party applications to end users. The users may access system 100 and/or individual external resources via client computing platform(s) 104.

In some implementations, the individual third-party resources of external resource(s) 126 may include individual applications providing the third-party content to system 100. An application may include one or more of a calendar application, a payment application, an electronic communication application, a social media application, a video conference application, a project management application, a customer relationship management application, a ticketing application, a partner relationship management application, a web form application, and/or other applications outside of the system 100 providing one or more services. It is noted that this list of applications providing the third-party content is provided for illustrative purposes only and not to be considered limiting. Instead, it is to be understood that other applications providing the third-party content may be considered which are within the scope of the present disclosure. In some implementations, external resource(s) 126 and/or other considerations of applications providing the third-party content may be considered as such by virtue of otherwise being unaffiliated with system 100. In some implementations, external resource(s) 126 and/or other considerations of applications providing the third-party content may be considered as such by virtue of utilizing other servers, processors, and/or other components which may be separate and distinct from system 100. In some implementations, external resource(s) 126 and/or other considerations of applications providing the third-party content may be considered as such by virtue of being created and/or administered by entities that may be separate and distinct from creators and/or administrators of system 100.

A calendar application may comprise a software application configured to provide users with an electronic version of a calendar. The calendar application may provide an appointment book, address book, contact list, and/or other features and/or functionality. In some implementations, a calendar application may provide functionality of setting calendar events, setting reminders, and/or other functionality.

A payment application may comprise an e-commerce payment application, electronic payment application, peer-to-peer payments application, an electronic wallet application, and/or other applications that facilitate the sending and/or receiving of electronic payments and/or other online transactions.

A video conferencing application may comprise a software application configured to provide users the ability to stream real-time audio and/or video. The video conferencing application may provide a user interface display of video content (e.g., streamed video from one or more participants in a meeting), messaging functionality, and/or other content.

An electronic communication application may comprise an application for providing electronic communication services. Electronic communication services may include one or more of electronic mail, instant messaging, private messaging, and/or other communications. An electronic communication application may provide functionality of one or more of compiling, sending, receiving, archiving, deleting, and/or performing other actions with respect to electronic communications.

A social media application may comprise an application configured to facilitate the creation and/or sharing of information via virtual communities and/or networks. A social media application may provide functionality of compiling, posting, reviewing, deleting, searching, and/or performing other actions with respect to information created and/or shared via virtual communities and/or networks.

A project management application may comprise an application configured to facilitate planning, organizing, and/or otherwise managing resources. A project management application may provide functionality of estimation and planning, scheduling, cost control and budget management, resource allocation, communication, decision-making, quality management, time management and documentation, administration systems, and/or other functionality.

Server(s) 102 may include one or more of non-transitory electronic storage 128, one or more processors 130 configured by machine-readable instructions 106, and/or other components. Machine-readable instructions 106 may include one or more instruction components. The instruction components may include computer program components. Executing the machine-readable instructions 106 may cause server(s) 102 to facilitate effectuating sets of automated actions based on trigger events. The instruction components may include one or more of an environment state component 108, an automation component 110, a detection component 112, an effectuation component 114, and/or other instruction components.

Environment state component 108 may be configured to manage environment state information and/or other information used in maintaining a collaboration environment. The collaboration environment may be configured to facilitate interaction by users with the collaboration environment and/or each other. In some implementations, third-party content may be embedded into the collaboration environment so that it appears as part of the collaboration environment. The embedded third-party content may be managed by the server(s) 102 and stored within a record structure used by the server(s) 102 for managing the content of the collaboration environment itself.

By way of non-limiting illustration, the environment state information may include one or more of environment records defining content of the collaboration environment itself, third-party content records defining third-party content embedded into the collaboration environment, and/or other information. The environment records may include values of environment parameters and/or other information. The third-party content records may include third-party information comprising values of embedded content parameters and/or other information. The environment parameters may characterize one or more of users of the collaboration environment (e.g., via user parameters), units of work managed, created, and/or assigned within the collaboration environment (e.g., via work unit parameters), projects (e.g., via project parameters), business objectives (e.g., via objective parameters), and/or other information. The embedded content parameters may characterize the third-party content embedded within the collaboration environment and/or other information.

The environment records may include one or more records. The one or more records may include one or more of user records, work unit records, project records, objective records, and/or other records. The user records may include user information comprising values of user parameters associated with the users of the collaboration environment. The work unit records may include work information comprising values of work unit parameters associated with units of work managed, created, and/or assigned within the collaboration environment. The project records may include project information comprising values of project parameters associated with projects managed within the collaboration environment. The objective records may include objective information comprising values for objective parameters associated with business objectives defined within the collaboration environment.

The work information in the work unit records may include values of one or more work unit parameters. The values of the work unit parameters may be organized in work unit records corresponding to units of work managed, created, and/or assigned within the collaboration environment. A given unit of work may have one or more assignees and/or collaborators working on the given work unit. Units of work may include one or more to-do items, action items, objectives, and/or other units of work one or more users should accomplish and/or plan on accomplishing. Units of work may be created by a given user for the given user and/or created by a given user and assigned to one or more other users. Individual units of work may include one or more of an individual task, an individual sub-task, and/or other units of work assigned to and/or associated with one or more users. Individual units of work may include one or more digital content items. An individual unit of work may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, units of work created by, assigned to, and/or completed by the users may refer generally to a linking of the units of work with the individual users in the collaboration environment. A unit of work may be linked with a user in a manner that defines one or more relationships between the user and the unit of work. Such a relationship may connote and/or be a result of an action (past, present, and/or future) of the user with respect to the unit of work. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, values of work unit parameters may include one or more of a unit of work name, a unit of work description, one or more unit of work dates (e.g., a start date, a due date or end date, a completion date, and/or dates), one or more users linked to a unit of work (e.g., an owner, one or more collaborators, collaborator access information, and/or other information), role information, a status parameter (e.g., an update, a hardcoded status update, a completed/incomplete/mark complete, a measured status, a progress indicator, quantity of sub-units of work remaining for a given unit of work, measure of urgency, and/or other status parameter), one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), one or more performance/productivity metrics for a given unit of work, hierarchical information, one or more custom fields (e.g., priority, cost, stage, and/or other custom fields), and/or other information.

In some implementations, the one or more work unit parameters may include one or more of a work assignment parameter, work completion parameter, and/or other parameters. The values of the work assignment parameter may describe and/or identify users assigned to the individual units of work. The user may be described and/or identified based on one or more interactions by one or more users with a collaboration environment. In some implementations, one or more users may create and/or assign one or more unit of work to themselves and/or another user. In some implementations, a user may be assigned a unit of work and the user may effectuate a reassignment of the unit of work from the user or one or more other users. In some implementations, values of the work completion parameter may indicate that a status of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date).

In some implementations, managing by the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more of a list view, a calendar view, and/or other views. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.).

Project information in project records may define values of project parameters for projects created and/or managed within the collaboration environment. The project parameters may characterize one or more projects managed within the collaboration environment and/or via the collaboration environment, and/or the metadata associated with the one or more projects. Individual ones of the projects may be associated with individual ones of the project records. The project information may define values of the project parameters associated with a given project managed within the collaboration environment and/or via the collaboration environment. A given project may have one or more owners and/or one or more collaborators working on the given project. The given project may include one or more units of work assigned to one or more users under a given project heading. In some implementations, projects may include one or more units of work that may directly facilitate progress toward fulfillment of the projects. Accordingly, completion of the set of units of work may directly contribute to progress toward fulfillment of the project. By way of non-limiting illustration, an individual project may be associated with a client and the units of work under the individual project heading may be work directly contributing to the fulfillment of a business relationship with the client.

The values of the project parameters may, by way of non-limiting example, include one or more of: one or more units of work supporting individual ones of the projects (which may include values of work unit parameters included in one or more work unit records), one or more users linked to the project (which may include values of user parameters defined by one or more user records), role information, one or more user comment parameters (e.g., a creator, a recipient, one or more followers, one or more other interested parties, content, one or more times, upvotes, other hardcoded responses, etc.), a project name, a project description and/or background summary, a project problem statement, a project solution statement, one or more risks associated with the project, one or more project dates (e.g., a start date, a due date, a completion date, and/or other project dates), one or more project collaborators (e.g., an owner, one or more other project collaborators, collaborator access information, and/or other information), a status and/or progress (e.g., an update, a hardcoded status update, a measured status, quantity of units of work remaining in a given project, completed units of work in a given project, and/or other status parameter), one or more resources, one or more business objectives supported by the projects, notification settings, permissions information, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, project records may include permissions information for the individual projects. The permissions may specify access restrictions for the individual project. The access restrictions may be specified on a user-basis, user role-basis (e.g., based on one or more of organization role, role in units of work, and/or project-level role), for groups of users, and/or specified in other ways.

Role information may be specified in one or more of the work unit records, project records, user records, and/or other records. The role information may specify roles of the users within the units of work, the projects, and/or a business organization as a whole. The roles may convey expected contribution of the users in completing and/or supporting the units of work and/or the projects. The individual roles of individual users within the units of work may be specified separately from the individual roles of the individual users within the projects. The project parameters may include a project role parameter characterizing the individual roles of the individual users with respect to individual projects.

A role may represent expected contribution of the users in completing and/or supporting the units of work and/or the projects. A role specified with respect to units of work and/or projects may be different from roles traditionally specified with respect to a business organization as a whole (e.g., President, CEO, intern, product designer, legal counsel, etc.). For example, an organization role may be "Product Designer"; a project role may be "Design Lead"; and a role on an individual unit of work may be "Approver."

A role within a unit of work may be specified based on one or more of a job title, a description of what the user should accomplish and/or plan on accomplishing for the given unit of work, and/or other specifications. By way of non-limiting illustration, a role within a unit of work may include one or more of general assignee, graphic designer, engineer, tester, writer, artist, mechanic, and/or other descriptions.

A role within a project (e.g., a "project-level role") may be specified based on a description of what the user may be supporting and/or plan on supporting for the given project, and/or other specifications. By way of non-limiting illustration, a role within a project may include one or more of owner, design, marketing, copy, legal, engineering, art director, and/or other descriptions. Although the specification of the role in a project may include the same or similar words as the role in a unit of work, the role in the project may enable and/or disable features within the collaboration environment otherwise not available to users of having roles in individual units of work but not at the project level. In some implementations, roles within a project may take on a more supervisory connotation than the roles within the individual units of work.

The objective information in objective records may include values of one or more objective parameters. The values of the objective parameters may be organized in objective records corresponding to business objectives managed, created, and/or owned within the collaboration environment. A given business objective may have one or more collaborators, and/or team members working on the given business objective. Business objectives may include one or more associated units of work and/or projects one or more users should accomplish and/or plan on accomplishing. Business objectives may be created by a given user for the given user and/or created by the given user and assigned to be owned to one or more other users. Individual business objectives may include one or more of an individual goal, an individual sub-goal, and/or other business objectives assigned to be owned by a user and/or associated with one or more users.

The business objectives may be associated with a set of units of work and/or projects that may indirectly facilitate progress toward fulfillment of the business objectives. The set of units of work and/or projects may not directly contribute to the progress. By way of non-limiting illustration, a connection between the set of units of work and/or projects and a corresponding business objective may be indirect in that completion of at least one of the units of work and/or projects may have no direct impact on progress toward fulfillment of the business objective. The concept of "no direct impact" may mean that completion of the at least one unit of work and/or project may not cause progress toward fulfillment of the business objective without independent action outside of the at least one unit of work and/or project. Instead, the fulfillment of the at least one unit of work and/or project may make such independent action more likely (e.g., through coercion, assistance, education, incentivization, reminder, etc.). However, in some implementations, business objectives may be associated with a set of units of work and/or projects that may directly facilitate progress toward fulfillment of the business objectives. Accordingly, completion of the set of units of work and/or projects may directly contribute to the progress toward fulfillment. Business objectives may be associated with an objectives and key result (OKR) goal-setting framework. Business objectives may be specified on one or more of a team basis, organization basis, and/or other specifications. In some implementations, business objectives may be characterized as user objectives. The user objectives may be associated with a set of units of work and/or projects that may indirectly (and/or directly) facilitate progress toward fulfillment of the user objectives. User objectives may be specified on an individual user basis.

Individual objective records may describe individual business objectives and identify sets of individual ones of the work unit records and/or project records that specify the units of work and/or projects as being associated with the individual business objectives.

Individual sets of objective records may be defined by an objective record hierarchy. An objective record hierarchy may convey individual positions of objective records (and their corresponding business objectives) in the objective record hierarchy. By way of non-limiting illustration, a position may specify one or more of an objective record being superior to one or more other objective records, an objective record being subordinate to one or more other objective records, and/or other information. As a result, individual objective records may be subordinate and/or superior to other individual objective records. For example, the objective records may further include a second objective record. The first objective record and the second objective record may be organized by a first objective record hierarchy specifying that the second objective record is subordinate to the first objective record.

An objective record may define a business objective comprising a progress towards fulfillment, and a subordinate objective record may define a business objective comprising a subordinate progress towards fulfillment to the subordinate business objective. An objective record hierarchy may define a relationship between objective records.

Individual objective records may include hierarchical information defining an objective record hierarchy of the individual objective records. The hierarchical information of an objective record may include one or more of information identifying other objective records associated in an objective record hierarchy the objective record belongs to, a specification of the position of the objective record in the hierarchy, other relationships placed on the objective record by virtue of its position, and/or other information.

In some implementations, as a consequence of the objective record hierarchies, the individual business objectives described in the individual objective records that are subordinate to the other individual objective records may be subordinate to the individual business objectives in the other individual objective records.

In some implementations, the one or more objective parameters may include one or more of an objective definition parameter, an objective owner parameter, an objective management parameter, an objective creation parameter, an objective progress parameter, and/or other parameters. The value of the objective definition parameter may describe the particular business objective. The values of the objective owner parameter may describe business objectives assigned to be owned by an individual user. The values of the objective management parameter may describe business objectives managed as collaborators by the individual users. The values of the objective creation parameter may describe business objectives created by the individual users.

In some implementations, the business objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed units of work in a given project, and/or other progress information), one or more interaction parameters, notification settings, privacy, an associated URL, one or more custom fields (e.g., priority, cost, stage, and/or other custom fields), and/or other information.

The values of the objective owner parameter describing business objectives owned by the individual users may be determined based on one or more interactions by one or more users with a collaboration environment. In some implementations, one or more users may create and/or assign ownership of one or more business objectives to themselves and/or another user. In some implementations, a user may be assigned to own a business objective and the user may effectuate a reassignment of ownership of the business objective from the user or one or more other users.

The user information in the user records may include values of user parameters. The values of the user parameters may be organized in user records corresponding to users interacting with and/or viewing the collaboration environment. The values of the user parameters may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user.

The values of the user parameters may, by way of non-limiting example, specify one or more of: a user name, a group parameter, a user account, role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more units of work the user is associated with (units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of units of work, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

The third-party information in the third-party content records may include values of embedded content parameters. The values of the embedded content parameters may be organized in the third-party content records corresponding to the third-party resources providing the third-party content for integration into the collaboration environment. The values of the embedded content parameters may include information describing the third-party content, metadata associated with the third-party content, and/or other user information. Individual ones of the third-party resources may be associated with individual ones of the third-party content records.

The embedded content parameters may characterize the third-party content in ways that may be specific to the third-party content and/or how the third-party content may be presented within views of the collaboration environment. In some implementations, administrators of the third-party resources and/or developers utilizing the third-party content may dictate how the embedded content parameters characterize the third-party content. In some implementations, administrators of the system 100 may dictate how the embedded content parameters characterize the third-party content. Since the form, content, and/or display requirements for the third-party content may vary widely between different third-party resources, it is appreciated that a particular characterization of the third-party content based on a given embedded content parameter may also vary depending on a particular application. Further, embedded content parameters may be given different names as needed to properly characterize the third-party content. Accordingly, the below examples of the embedded content parameters and/or the characterizations attributed individual ones of them are intended for illustrative purposes only and not to be considered limiting.

By way of non-limiting illustration, embedded content parameters for a calendar application may characterize the content provided by the application and/or the features and/or functionality of the application. By way of non-limiting illustration, the values of the embedded content parameters for a calendar application may include one or more of names of calendar entries, dates of calendar entries, who created the calendar entries, how a calendar view is presented (e.g., month views, week views, week views including Monday-Friday, week views including Monday-Sunday, etc.), and/or other information.

The embedded content parameters for a payment application may characterize the content provided by the application and/or the features and/or functionality of the application. By way of non-limiting illustration, the values of the embedded content parameters for a payment application may include one or more of an amount of payment, a date and/or time a payment should be sent, a payment recipient, a payment source, a currency type, a payment schedule, and/or other information.

The embedded content parameters for an electronic communication application may characterize the content provided by the application and/or the features and/or functionality of the application. By way of non-limiting illustration, the values of the embedded content parameters for an electronic communication application may include one or more of unread messages, sender address, recipient addresses, a configuration of an inbox (e.g., layout of incoming messages), and/or other information.

The embedded content parameters for a social media application may characterize the content provided by the application and/or the features and/or functionality of the application. By way of non-limiting illustration, the values of the embedded content parameters for a social media application may include one or more of posts, comments, photos, text input field for generating new content, username, avatars, and/or other information.

The embedded content parameters for a video conference application may characterize the content provided by the application and/or the features and/or functionality of the application. By way of non-limiting illustration, the values of the embedded content parameters for a video conference application may include one or more of received video content, received audio content, configuration of a display window to show visual content, status of a current meeting (e.g., scheduled, ongoing, ended, etc.), and/or other information.

In some implementations, environment state component 108 may be configured to effectuate presentation of a user interface of the collaboration environment. The user interface may present one or more of values of the environment parameters, values of the embedded content parameters, and/or other information. In some implementations, the user interface may display pages that facilitate access to one or more records. By way of non-limiting illustration, pages may include one or more of user pages that provide access to individual user records, work unit pages that provide access to individual work unit records, project pages that provide access to individual project records, objective pages that provide access to individual objective records, and/or other pages that provide access to one or more records.

In some implementations, user actions within the collaboration environment may include effectuating one or more changes in one or more values of one or more of the environment parameters, the embedded content parameters, and/or other content parameters. User actions may be facilitated through the user interface presenting the collaboration environment. By way of non-limiting illustration, a user action may include marking a unit of work "complete." Marking a unit of work complete may change a value of a work unit parameter for the unit of work from "incomplete" to "marked complete." User actions may include other changes to other values of other environment parameters and/or embedded content parameters described herein.

In some implementations, the third-party content may be embedded within the collaboration environment such that the third-party content appears within one or more pages of the collaboration environment. In some implementations, the third-party content may be embedded within the collaboration environment such that the third-party content appears within one or more pages of the collaboration environment alongside other content of the collaboration environment. In some implementations, the third-party content may be presented in one or more portions of one or more pages dedicated to presenting the third-party content.

In some implementations, the third-party content may be embedded within the collaboration environment by performing an application programming interface (API) call to a third-party resource (e.g., an external resource), obtaining a response from the third-party resource, and/or updating the values of the embedded content parameter based on the response. In some implementations, changes to the third-party content as embedded in the collaboration environment may cause corresponding changes to the third-party content as managed by the third party resource. For example, system 100 may communicate with a third-party resource to consolidate and/or merge changes so that information is consistent and/or persistent between system 100 and/or the third party resource.

In some implementation, environment state component 108 may be configured to effectuate presentation of individual user interfaces on individual client computing platforms of one or more client computing platforms 104. For example, the individual client computing platforms may access a user interface over network 116. A given user interface may be configured to facilitate user specification of sets of automated actions and/or trigger events. In some implementations, environment state component 108 may be configured to prevent presentation of individual user interfaces configured to facilitate user specification (and/or modification) of sets of automated actions and/or trigger events by users who may not be authorized within system 100.

In some implementations, environment state component 108 may be configured to effectuate presentation of a user interface through which users may specify and/or select one or more of one or more automated actions, one or more trigger events, one or more automation templates, and/or other information. In some implementations, a user interface may display one or more conflict reports and/or other prompts and/or notifications to a user. In some implementations, users may provide entry and/or selection of a period of time or times when an automation record may be active (e.g., configured to be executed) and/or paused (e.g., configured to not be executed). By way of non-limiting illustration, a user interface element may comprise an "active/paused" toggle button.

The user interface may include one or more user interface portions. By way of non-limiting illustration, a user interface may include one or more input portions and/or other components. Individual portions may include one or more user interface elements configured to facilitate user interaction with the user interface. By way of non-limiting illustration, the user interface elements may include one or more of text input fields, drop down menus, check boxes, display windows, virtual buttons, and/or other elements configured to facilitate user interaction.

An input portion of a user interface may be configured to obtain user input to specify automation information and/or other information (see, e.g., automation component 110). Briefly, the user input may include one or more of entry and/or selection of environment parameters and/or embedded content parameters to carry out automated actions on, entry and/or selection of values to apply to the environment parameters and/or embedded content parameters as part of the automated actions, entry and/or selection of environment parameters and/or embedded content parameters from which trigger events are derived, entry and/or selection of values of the environment parameters and/or embedded content parameters associated with deriving the trigger events, user entry and/or selection of one or more automation templates, and/or other input.

In some implementations, in response to entry and/or selection of an embedded content parameters (for either an automated action and/or trigger), the user interface may present a prompt confirming the use of the associated third-party content. This may be a safeguard against inadvertently carrying out actions on the third-party content. A user may confirm and/or deny the prompt, via, for example, selecting a virtual button and/or an authentication procedure.

Automation component 110 may be configured to generate automation information and/or other information. The automation information may be generated based on user entry and/or selection of the automation information into a user interface. In some implementations, automation information may specify sets of automated actions to carry out within the collaboration environment in response to occurrence of trigger events. The automated actions may target the embedded third-party content and/or locally hosted content of the collaboration environment. The trigger events may be derived from the embedded third-party content and/or locally hosted content of the collaboration environment.

The user entry and/or selection of the automation information may include entry and/or selection of one or more of individual automated actions in individual sets of automated actions, individual trigger events, and/or other information. By way of non-limiting illustration, the automation information may specify a first set of automated actions to carry out in response to a first trigger event. The first trigger event may be derived from the third-party content embedded within the collaboration environment and/or other source. The first set of automated actions and/or the first trigger event may be generated based on input by a first user into a user interface. The first set of automated actions may include one or more automated actions to carry out within the collaboration environment.

In some implementations, an individual automated action may be defined by a target component and/or an action component. The target component may identify an individual one of an environment parameter, an embedded content parameter, and/or other parameter to which an action is to be carried out on. The action component may define instructions to effectuate the action with respect to the individual one of the environment parameter, the embedded content parameter, and/or other parameter. In some implementations, the automation information may further specify one or more of the trigger events as being derived from the values of the environment parameters and/or embedded content parameters.

In some implementations, an individual automated action within the collaboration environment may include effectuating one or more of creation of, change in, and/or specification of, individual values of the individual ones of the environment parameter, the embedded content parameter, and/or other parameters. In some implementations, the creation of, change in, and/or specification of values may be accomplished by accessing (and/or creating) a corresponding record (e.g., user record, work unit record, project record, third-party content record, and/or other records). In some implementations, creation of, change in, and/or specification of an individual value may be reflected in views of the collaboration environment accessed by users.

In some implementations, individual automated actions within the collaboration environment may be classified by individual action types. An action type may dictate the extent in which an automation action effects the collaboration environment and/or embedded third-party content. An action type may include one or more of a record creation type, value specification type, and/or other types. The record creation type automated action may include creating one or more records. The creation of a record may include generating an instance of the record in the collaboration environment. The creation of the record by the record creation type automated action may not specifically define values of the environment parameters, embedded content parameters, and/or other information within the record and/or may set values to one or more of default values, null values, and/or other values. The value specification type automated action may include changing, and/or specifying, one or more values of one or more of the environment parameters and/or embedded content parameters contained within a record.

In some implementations, value specification type automated action may further be classified by one or more action subtypes based on the individual values of the individual environment parameters and/or individual embedded content parameters associated with the individual automated actions. An action subtype may include one or more of a time-based subtype, privacy and/or permissions subtype, accessibility subtype, interaction subtype, and/or other subtype.

An automated action of the time-based subtype may effectuate change in, and/or specification of, one or more values related to time. For a work unit record, this may include one or more unit of work dates (e.g., a start date, a due date, a completion date, and/or dates). For a user record, this may include one or more of a start of employment date, an end of employment date, a length of employment period, a length of vacation period, and/or other information.

An automated action of the privacy and/or permissions subtype may correspond to values of parameters related to privacy and/or permissions. By way of non-limiting illustration, an automated action performed on a user record being of the privacy and/or permissions subtype may include change of, and/or specification of, one or more of one or more teams a user belongs to, one or more user display settings (e.g., colors, size, task order, other unit of work order, etc.), one or more authorized applications, application access information (e.g., username/password for one or more third-party applications), one or more favorites and/or priorities, and/or other information for the user. By way of non-limiting illustration, an automated action performed on a work unit record being of the privacy and/or permissions subtype may include change of, and/or specification of, one or more of one or more user comment parameters, notification settings, privacy settings, dependencies between one or more units of work, and/or other values.

An automated action of the accessibility subtype may correspond to values of parameters which may be required in a record in order for the record to take effect within the collaboration environment. Values of environment parameters, embedded content parameters, and/or other information which may be required in a record in order for the record to take effect may refer to values that, if left undefined, would not provide any meaningful use within the collaboration environment. In other words, the values of environment parameters, embedded content parameters, and/or other information which may be required in a record in order for the record to take effect may refer to a minimum quantity values of parameters which may need to be specified in order to allow users to interact with and/or access the record. By way of non-limiting illustration, an automated action performed on a user record being of the accessibility subtype may include change of, and/or specification of, one or more of a user name, a user account, a user role, a user department, descriptive user content, a to-email, a from-email, a photo, an organization, and/or other values. By way of non-limiting illustration, an automated action performed on a work unit record being of the accessibility subtype may include change of, and/or specification of, one or more of a unit of work description, one or more members associated with a unit of work (e.g., an owner, one or more other task members, member access information, one or more assignees, and/or other information), an associated URL, and/or other values.

An automated action of the interaction subtype may correspond to values of environment parameters, embedded content parameters, and/or other information which may be specified in a record in order to provide further functionality and/or accessibility within the collaboration environment. Values of environment parameters, embedded content parameters, and/or other information which may be specified in a record (user and/or work unit) in order to provide further functionality and/or accessibility may refer to values other than those associated with the time-based subtype, privacy and/or permissions subtype, accessibility subtype, and/or other subtypes.

It is noted that the classification of automated actions into action types and/or subtypes, and/or the descriptions of the different action types and/or subtypes are provided for illustrative purposes only. Instead, it is to be understood that action types and/or subtypes may be described in other ways, and/or automated actions may be classified in other ways.

In some implementations, an individual automated action may be carried out simultaneously (or near simultaneously) with an individual detection of an individual occurrence of an individual trigger event and/or within a specified time frame following an individual detection of an individual occurrence of an individual trigger event. In some implementations, a specified time frame may include a "waiting" period of time before an action is carried out. In some implementations, the waiting period of time may be satisfied by one or more of the passage of the period of time, some other trigger event, and/or other events and/or actions within the collaboration environment.

In some implementations, individual trigger events may be specified as individual occurrences of change of the values of the environment parameters, embedded content parameters, and/or other information. Occurrences of change may convey a state change of an environment parameter, an embedded content parameter, and/or other parameter. The state change may not consider what the change is, but instead that a change occurred. For example, a trigger event may include an occurrence of a change in a value. By way of non-limiting illustration, the first trigger event may be associated with the first change (and not necessarily specifically the change to the second value).

In some implementations, individual trigger events may be specified as specified individual values of the environment parameters, embedded content parameters, and/or other parameters. Changes to specific values may be referred to as data state changes. The data state change may refer to a change of a value of a parameter to a specific value from an other value (and/or from a state of being unspecified). For example, a trigger event may include an occurrence of a reassignment of a unit of work from one user to another specific user. For example, a trigger event may include embedded billing software sending a final invoice to a specific customer (e.g., an embedded content parameter having a value changing from "not sent" to "sent"). By way of non-limiting illustration, the first trigger event may be associated with the second value and/or other values.

In some implementations, a set of automated actions may be associated with one or more of a sequence in which automated actions in the set are to be carried out, concurrent carrying out of two or more of the automated actions in the set, and/or other features and/or functionality. The automated actions within a set of automated actions may have a specified ordered sequence in which the automated actions are to be carried out. In some implementations, one or more actions may be followed by, and/or preceded by, a specified waiting period. A set of automated actions may specify that two or more actions may be carried out concurrently. In some implementations, a user may specify a combination and/or sequence of multiple triggers and/or multiple automated actions as a multi-step "workflow" that may include branching logic. By way of non-limiting illustration, a chain of trigger/action pairs of a given sequence may result in facilitating a workflow.

In some implementations, individual sets of automated actions and associated individual trigger events may be stored in individual automation records. An automation record may define one or more of individual actions, individual trigger events, and/or other information.

Individual trigger events may be defined by a source component, an event component, and/or other information. The source component of an automation record may include the environment parameter(s), embedded content parameter(s), and/or other parameter(s) and/or external resource(s) from which occurrences of a trigger event may be derived. The event component may include the value (or change in the value) for the environment parameter(s), embedded content parameter(s), and/or other parameter(s) and/or the information indicating a trigger event has occurred.

In some implementations, individual automation records may store counts of occurrences of individual trigger events and/or occurrences of carrying out individual automated actions in the sets of automated actions.

It is noted that while some descriptions presented herein may be directed to an individual trigger event causing an individual set of automated actions to be carried out, this is for illustrative purposes only and not to be considered limiting. For example, in some implementations, multiple trigger events may be combined together through some logic criteria, that when satisfied, may cause an individual set of automated actions to be carried out within the collaboration environment. Logic may include, for example, Boolean logic. By way of non-limiting illustration, logic operators such as "AND", "OR", "NOT", and/or other operations may be utilized to generate more complex trigger combinations for sets of automated actions. In some implementations, the use of logic operators may allow for fewer discrete trigger events to be defined yet still have more complex behavior available to users. For example, there may not need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, instead of input "than-if-then" or "if-and-if-then", logic may include "if-then-then" and/or other operators. In some implementations, a user may specify a set, or pool, of trigger events to trigger one or more automated actions. In some implementations, user may specify that one or more of the trigger events in the set may individually and/or in combination trigger the one or more automated actions. This way, a user may specify multiple options of trigger events which may trigger one or more automated actions. Further, an individual trigger event may trigger multiple automated actions.

Detection component 112 may be configured to detect occurrence(s) of the trigger events. In some implementations, trigger events may be derived from the third-party content embedded within the collaboration environment and/or other content. In some implementations, the trigger events may be detected based on changes in the values of the embedded content parameters. By way of non-limiting illustration, an occurrence of the first trigger event may be detected based on a first change in a first value of a first embedded content parameter to a second value.

Effectuation component 114 may be configured to, responsive to the detection of the occurrence of individual trigger events, effectuate individual sets of automated actions within the collaboration environment. By way of non-limiting illustration, responsive to the detection of the first trigger event, the first set of automated actions may be effectuated within the collaboration environment.

In some implementations, in response to effectuating the action with respect to the embedded content parameter, effectuation component 114 may be configured to effectuate communication of instructions to a third-party resource to update information defined by the third-party resource based on the action with respect to the embedded content parameter. Effectuating communication may include performing an application programming interface (API) call and/or other interaction with the external resource to cause the external resource to execute one or more routines in accordance with the instructions. An API interaction may include one or more of Remote Procedure Call, Representational State Transfer, GraphQL, and/or other interaction.

In some implementations, automation component 110 may be configured to determine individual sets of repeated user actions by the individual users. The determination may be based on monitoring environment state information (e.g., change in values of environment parameters, embedded content parameters, and/or other monitoring), user actions, information indicating occurrence of the trigger events within the collaboration environment, and/or other information generated by and/or accessible to system 100. In some implementations, determining individual sets of repeated user actions by the individual users may include determining one or more actions and/or events occurring within the collaboration environment which precede the individual sets of repeated user actions. In some implementations, a set of user actions may be deemed "repeated" after the set of user actions occur more than once.

In some implementations, automation component 110 may be configured to generate recommendations for automation information based on individual sets of repeated user actions and/or other information. The recommendations may include individual recommended sets of automated actions and/or individual recommended trigger events which correspond to the individual sets of repeated user actions. In some implementations, individual recommended sets of automated actions may include the individual sets of repeated user actions. In some implementations, a recommendation may include a notification (e.g., pop-up message, email, and/or other notification) describing one or more of the individual sets of repeated user actions, the individual recommended sets of automated actions, the individual recommended trigger events, and/or other information.

By way of non-limiting illustration, a set of repeated user actions for a given user may include generating a specific task, assigning the specific task to a specific person (or persons), adding a comment to the task, updating embedded third-party content, performing actions in a separate third-party application associated with the embedded third-party content, and/or other actions. The automation component 110 may determine that the set of repeated user actions for the given user is preceded by another specific task being marked completed. The automation component 100 may be configured to generate a recommendation for automation information including a set of recommended automated actions including generating the specific task, assigning the specific task to the specific person (or persons), adding a comment to the task, generating and/or sending instructions to effectuate the action by the external application, and/or other actions. The automation component 110 may be configured such that the recommendation includes a recommended trigger event including the other specific task being "marked complete."

In some implementations, automation component 110 may be configured to obtain and/or generate one or more automation templates. An automation template may specify a predetermined set of automated actions to carry out in response to occurrence of a predetermined trigger event. The one or more automation templates may be stored by electronic storage 128 and/or other storage device(s). In some implementations, an automation template may represent sets of actions users may commonly carry out in response to an action and/or occurrence. In some implementations, automation templates may be created by system administrators, administrators of the third-party content and/or other users. In some implementations, the automation templates may be stored in a library for access and/or implementation by individual users.

The automation component 110 may be configured to analyze automation information to identify conflicts within the sets of automated actions and/or the trigger events. In some implementations, analyzing automation information may include simulating execution of the automation information in a testing environment to determine a potential outcome of the automation information. In some implementations, conflicts may include one or more of repeating and/or ongoing automated actions (e.g., where a set of automated actions may not have a finite end), an instance when an individual automated action comprises an individual trigger event (e.g., resulting in a looping of trigger-action-trigger-action, etc.), and/or other conflicts.

In some implementations, analyzing automation information may further include only allowing the execution of automated actions after a triggering event if the state specified in the actions are not already true. If they are already true, automation component 110 may recognize this as a conflict and not execute the action(s) again.

In some implementations, a user may use a user interface to construct and manipulate a representation of an automation record, rather than editing information within the automation record itself. This may allow automation component 110 to prevent conflicts in the execution of the automation records being edited in the "live" versions of the automated records. Further, automation component 110 may validate the representations and prevent configuration errors before saving them to the system 100.

In some implementations, automation component 110 may be configured to analyze automation information as a user is specifying the automation information within a user interface (see, e.g., environment state component 108) and/or after the automation information has been specified and saved. The user interface may be configured to present errors at a number of possible failure points as the user is interacting with the user interface in real-time and/or near-real time. The possible failure points may include one or more of configuration failures, run time failures, cadence failures, container failures, editing failures, invalid permissions to an external resource, and/or other information.

The configuration failures may be related to a scenario where a user constructs a representation of an automation record that contains some sort of conflict and/or is invalid, automation component 110 may validate that representation before saving or executing it, and notify the user contextually about the fixes that should be made in order to save and enable the automation record.

The run time failures may be related to determining that an automation record may be misconfigured when it attempts to execute the record. The automation component 110 may send notifications (e.g., email, on-screen notifications, and/or other notification) containing information about the configuration error, and/or how to resolve it. A similar notification may also be sent by automation component 110 if the execution fails due to some sort of system issue. In this case, the user may be notified that they do not need to take any action to resolve this failure.

The cadence failures may be related to when a trigger event may be misconfigured, the associated set of automated actions would never be executed because the trigger event may never be activated. To prevent this silent failure, the automation component 110 may be configured to run checks on a regular cadence of the automation records within the system 100. This cadence check may iterate through the triggers and/or actions on individual automation records, and notify an appropriate user.

The container failures may be related to when a user visits a container object (e.g., project, portfolio, etc.). The automation component 110 may present the user with pertinent status information about automation records associated with the container object, allowing them to fix any problems that may have arisen even without having seen any of the relevant notifications in other areas.

The editing failures may be related to editing an automation record with invalid components. A user may be directed through the user interface towards the specific components and/or associated inputs that may be causing an automation record to be invalid. This guided process may allow users to easily address and fix those issues so an automation record may resume operation.

The automation component 110 may be configured to generate conflict reports based on the analysis. In some implementations, a conflict report may include a description of one or more conflicts and/or an indication of nonexistence of conflicts. In some implementations, a conflict report may provide an indication of elements of an automated action and/or trigger event which may comprise a source of conflict.

In some implementations, automation component 110 may be configured to rate limit automated actions of one or more automation records. Rate limiting may include canceling and/or throttling execution of one or more automated actions based on one or more conditions. By way of non-limiting illustration, if one or more automated actions are triggered to execute more than X times in Y seconds, automation component 110 may be configured to cancel one or more executions in that Y-second window. The values of X and/or Y may be user specified and/or specified by the system 100. In some implementations, if one or more automated actions at a project level are executed more than A times in B seconds, automation component 110 may be configured to cancel one or more executions in that B-second window. The values of A and/or B may be user specified and/or specified by the system 100.

Figure 3:
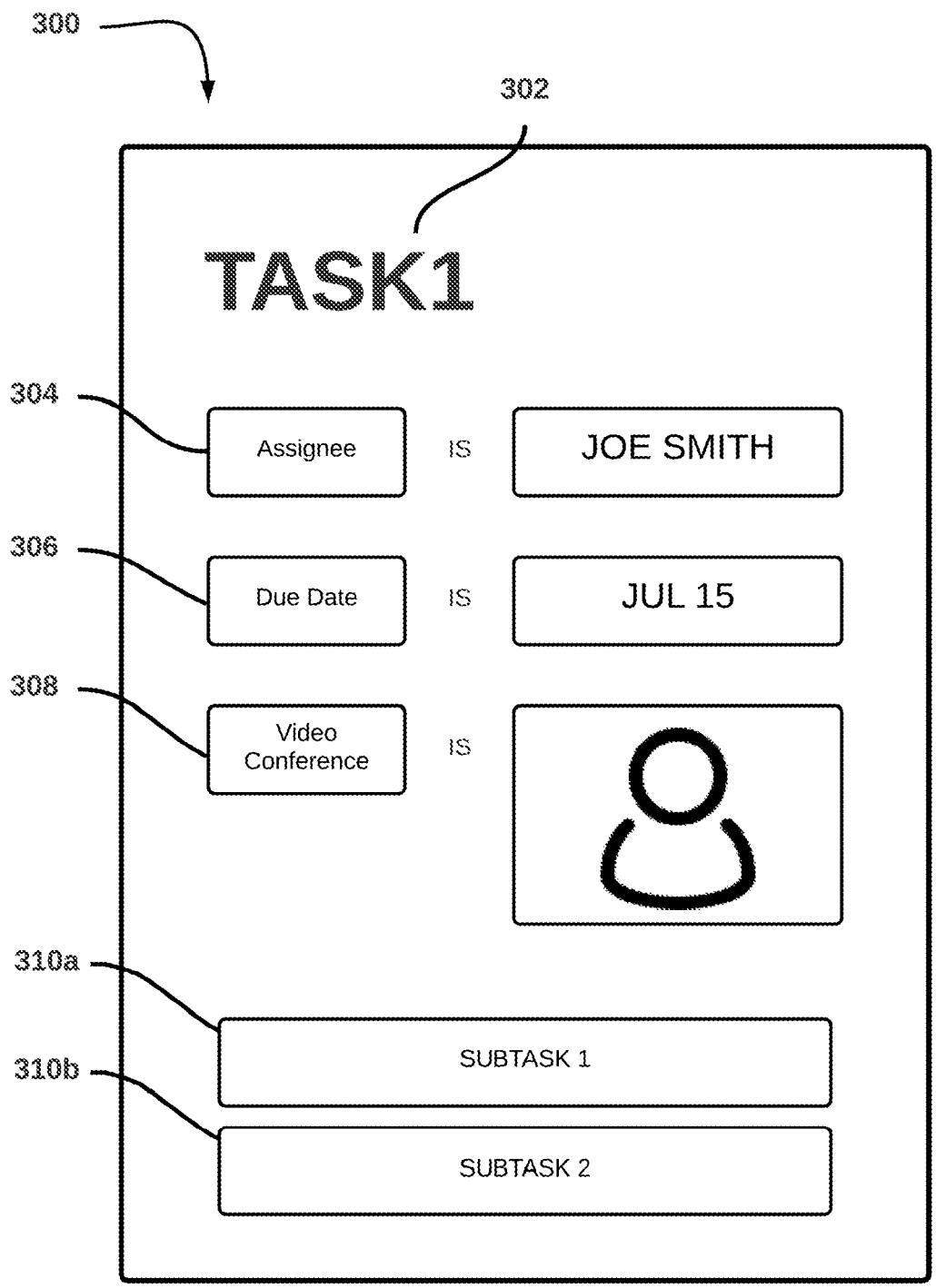
FIG. 3 illustrates an exemplary user interface, in accordance with one or more implementations.

FIG. 3 illustrates an exemplary user interface 300, in accordance with one or more implementations. The user interface 300 may include a work unit page for a unit of work (illustrated as "TASK1"). The work unit page may provide access to a work unit record for the unit of work. The work unit page may display one or more values of one or more environment parameters (e.g., work unit parameters) of the unit of work. By way of non-limiting illustration, the work unit page may display values for one or more of a work assignment parameter 304, a due date parameter 306, a first sub-unit of work parameter 310*a*, a second sub-unit of work parameter 310*b*, and/or other parameters. In some implementations, the work unit page may display third-party content. The work unit page may display third-party content by displaying values of one or more embedded content parameters. By way of non-limiting illustration, the work unit page may display one or more values of a first embedded content parameter 308. For illustrative purposes, the third-party content may include video conference content embedded into the work unit page. The first embedded content parameter 308 may characterize a video feed of a third-party video conference application, albeit embedded directly into the collaboration environment.

Figure 4:
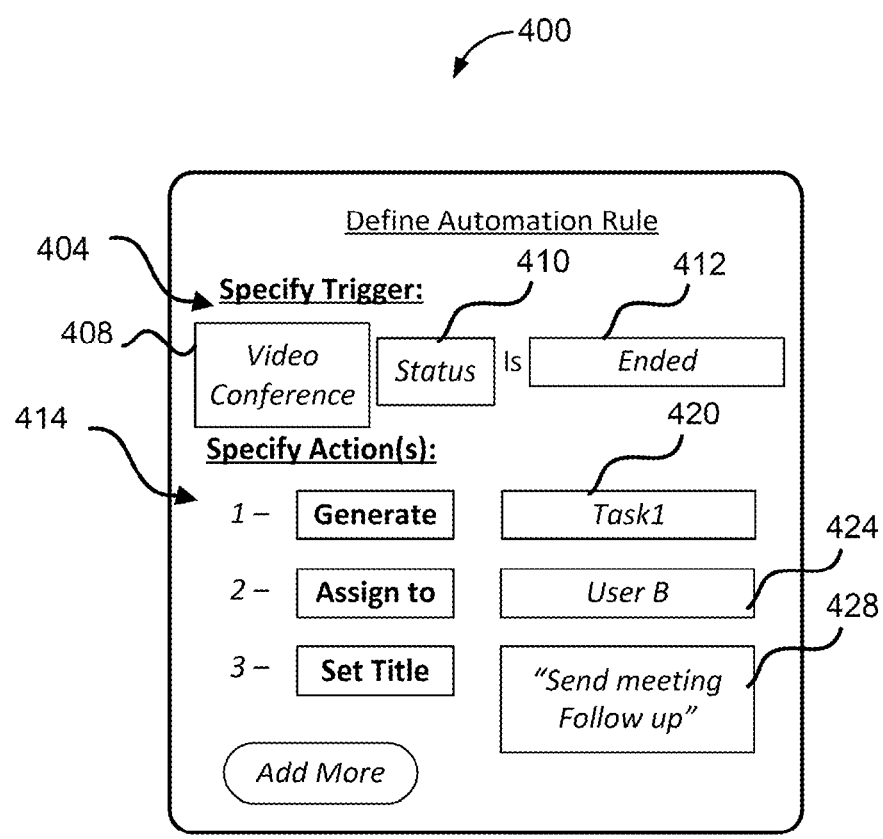
FIG. 4 illustrates an exemplary user interface, in accordance with one or more implementations.

FIG. 4 illustrates an exemplary user interface 400, in accordance with one or more implementations. The user interface 400 may be configured to obtain user entry and/or selection of automation information and/or other information. The user entry and/or selection may be in the form of specification of automated actions, trigger events, and/or other information.

In some implementations, automated actions may be specified based on entry and/or selection of one or more of individual parameters, individual actions for the individual parameters, and/or other information. In some implementations, trigger events may be specified based on one or more of entry and/or selection of environment parameters, embedded content parameters, and/or other information associated with trigger events, entry and/or selection of values associated with trigger events, and/or other information.

In some implementations, automated actions may be specified based on entry and/or selection of environment parameters, embedded content parameters, and/or other information to carry out actions on, entry and/or selection of values to apply to the entered and/or selected environment parameters and/or embedded content parameters, and/or other information.

The user interface 400 may include a trigger input portion 404 to obtain entry and/or selection of a trigger event. The trigger input portion 404 may include a user interface element 408 configured to obtain information identifying third-party content associated with the trigger event, a user interface element 410 configured to obtain entry and/or selection of an embedded content parameter associated with the trigger event, and a user interface element 412 configured to obtain entry and/or selection of a value for the embedded content parameter associated with the trigger event. For illustrative purposes, the trigger event in FIG. 4 may refer to the "status" of embedded video conference content being "ended."

The user interface 400 may include an automated action input portion 414 to obtain entry and/or selection of a set of automated actions. The automated action input portion 414 may include a user interface element 420 configured to obtain entry and/or selection of an identification of one or more actions. For illustrative purposes, the action may be to generate a work unit record for a unit of work (referred to as "Task1").

The automated action input portion 414 may include user interface element 424 configured to obtain entry and/or selection of a further action to carry out in the generated work unit record. For illustrative purposes, the action to carry out may include assigning to "User B."

The automated action input portion 414 may include a user interface element 428 configured to obtain entry and/or selection of a further action to carry out in the generated work unit record. For illustrative purposes, the further action may include setting the title of the unit of work to "send meeting follow up."

It is noted that FIG. 4 is for illustrative purposes only and is not to be considered limiting. Instead, it is to be understood that the user interface 400 may be configured in other ways and/or including other elements in accordance with one or more implementations of the system 100 presented herein.

Figure 5:
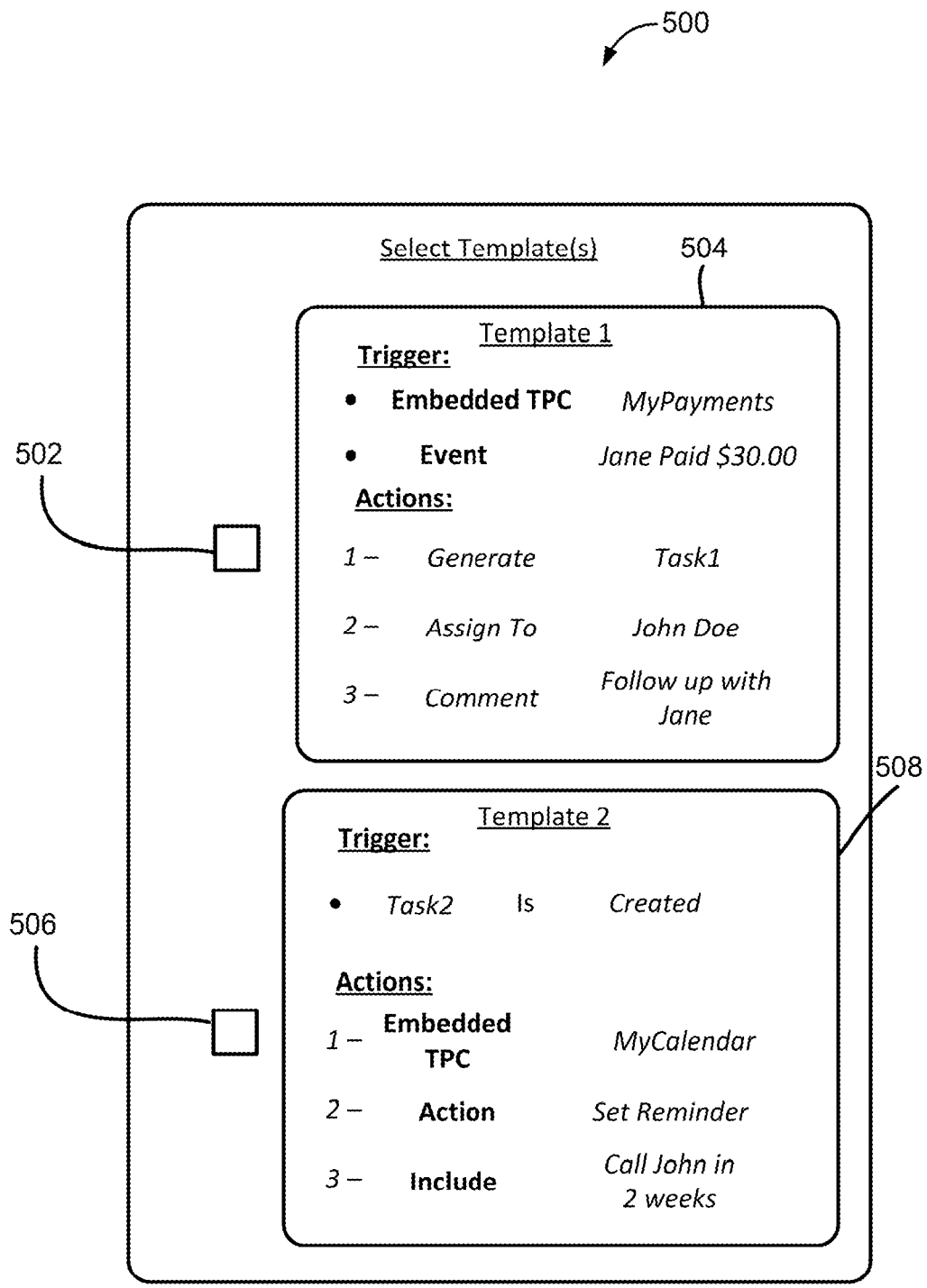
FIG. 5 illustrates an exemplary user interface, in accordance with one or more implementations.

FIG. 5 illustrates a user interface 500, in accordance with one or more implementations. The user interface 500 may include one or more user interface elements configured to facilitate user interaction with the user interface 500. The user interaction may include input to select one or more automation templates. By way of non-limiting illustration, the user interface 500 may include a first user interface element 502, a second user interface element 506, and/or other user interface elements. The first user interface element 502 may be selected to effectuate a first template 504. The second user interface element 506 may be selected to effectuate a second template 508.

It is noted that FIG. 5 is for illustrative purposes only and is not to be considered limiting. Instead, it is to be understood that the user interface 500 may be configured in other ways and/or including other elements in accordance with one or more implementations of the system 100 presented herein.

In FIG. 1, in some implementations, server(s) 102, client computing platform(s) 104, and/or external resource(s) 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connected to server(s)

102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, and/or other components. Processor(s) 130 may be configured to execute components 108, 110, 112, and/or 114, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
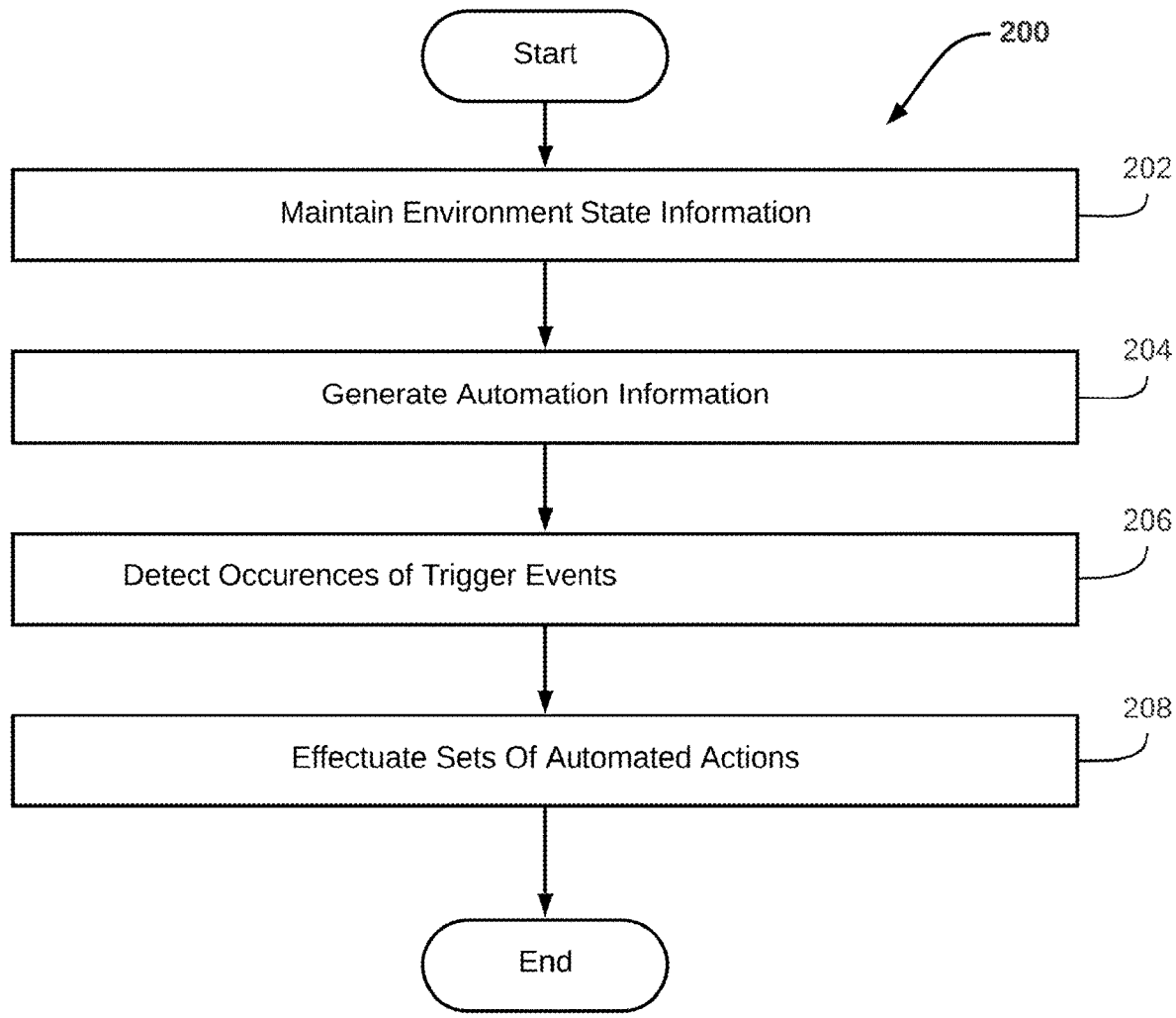
FIG. 2 illustrates a method to effectuate sets of automated actions within a collaboration environment including embedded third-party content based on trigger events, in accordance with one or more implementations.

FIG. 2 illustrates a method 200 to effectuate sets of automated actions based on trigger events, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information and/or other information used in maintaining a collaboration environment. The collaboration environment may be configured to facilitate interaction by users with the collaboration environment. The environment state information may include values of environment parameters, embedded content parameters, and/or other information. The environment parameters may characterize one or more of users of the collaboration environment, units of work managed, created, and/or assigned within the collaboration environment, and/or other information. The embedded content parameters may characterize third-party content embedded within the collaboration environment and/or other information. Operation 202 may be performed by one or more hardware processors configured by machine-readable instructions including a component that is the same as or similar to environment state component 108, in accordance with one or more implementations.

An operation 204 may generate automation information based on user entry and/or selection of the automation information and/or other information into a user interface. The automation information may specify sets of automated actions to carry out within the collaboration environment in response to occurrence of trigger events. By way of non-limiting illustration, the automation information may specify a first set of automated actions to carry out within the collaboration environment in response to a first trigger event derived from the third-party content embedded within the collaboration environment. Operation 204 may be performed by one or more hardware processors configured by machine-readable instructions including a component that is the same as or similar to automation component 110, in accordance with one or more implementations.

An operation 206 may detect occurrence of the trigger events. The occurrence of the trigger events may be detected from the third-party content embedded within the collaboration environment based on changes in the values of the embedded content parameters and/or other information. By way of non-limiting illustration, an occurrence of the first trigger event may be detected based on a first change in a first value of a first embedded content parameter to a second value. Operation 206 may be performed by one or more hardware processors configured by machine-readable instructions including a component that is the same as or similar to detection component 112, in accordance with one or more implementations.

An operation 208 may effectuate the sets of automated actions within the collaboration environment. The sets of automated actions may be effectuated responsive to the detection of the occurrence of the trigger events. By way of non-limiting illustration, responsive to the detection of the first trigger event, the first set of automated actions may be effectuated within the collaboration environment. Operation 208 may be performed by one or more hardware processors configured by machine-readable instructions including a component that is the same as or similar to effectuation component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to effectuate sets of automated actions within a collaboration environment based on trigger events derived from third-party content embedded in the collaboration environment, the system comprising:
    one or more physical processors configured by machine-readable instructions to:
        manage, by a server, environment state information maintaining a collaboration environment, the collaboration environment being configured to facilitate interaction by users with the collaboration environment, the environment state information including values of environment parameters and embedded content parameters, the environment parameters characterizing the users and units of work managed, created, and/or assigned within the collaboration environment, the embedded content parameters characterizing third-party content embedded within the collaboration environment;
        obtain, by the server, the third-party content from third-party resources managed by third-party servers, the third-party servers operating outside of the system, the third-party resources including a video conferencing application and a calendar application;
        obtain, by the server and from the calendar application, first information characterizing a calendar view layout of a third-party user interface of the calendar application;
        update, by the server, the values of the embedded content parameters based on the first information;
        obtain, by the server and from the video conferencing application, second information characterizing a video conference interface of the video conferencing application;
        update, by the server, the values of the embedded content parameters based on the second information;
        effectuate presentation of a calendar view in a user interface of the collaboration environment, wherein the user interface presents the values of the environment parameters and the values of the embedded content parameters so that the third-party content is displayed within the user interface of the collaboration environment in a same calendar view layout as the calendar view layout of the third-party user interface of the calendar application;
        generate automation information based on user entry and/or selection of the automation information into the user interface, the automation information specifying sets of automated actions to carryout within the collaboration environment in response to occurrence of trigger events derived from the third-party content embedded within the collaboration environment, such that the automation information specifies a first set of automated actions to carry out within the collaboration environment in response to a first trigger event derived from the third-party content embedded within the collaboration environment;
        detect occurrence of the trigger events from the third-party content embedded within the collaboration environment based on changes in the values of the embedded content parameters, such that an occurrence of the first trigger event is detected based on a first change in a first value of a first embedded content parameter to a second value;
        responsive to the detection of the occurrence of the trigger events, effectuate the sets of automated actions within the collaboration environment, such that responsive to the detection of the first trigger event, effectuate the first set of automated actions within the collaboration environment; and
        wherein the third-party content, the first information, and the second information are obtained by the server by performing one or more application programming interface calls to the third-party resources, obtaining responses from the third-party resources, and updating the values of the embedded content parameters based on the responses.

2. The system of claim 1, wherein an automated action is defined by a target component and an action component, the target component identifying an environment para meter to which an action is to be carried out with, and the action component defines instructions to effectuate the action with respect to the environment parameter.

3. The system of claim 1, wherein an automated action is defined by a target component and an action component, the target component identifying an embedded content parameter to which an action is to be carried out with, and the action component defines instructions to effectuate the action with respect to the embedded content parameter.

4. The system of claim 3, wherein the one or more physical processors are further configured by the machine-readable instructions to:
    in response to effectuating the action with respect to the embedded content parameter, effectuate communication of instructions to an individual third-party resource to update information defining the individual third-party resource based on the action with respect to the embedded content parameter.

5. The system of claim 1, wherein a trigger event is defined by a source component and an event component, the source component identifying an embedded content parameter from which occurrences of the trigger event are derived, and the event component defines a state of the embedded content parameter dictating occurrence of the trigger event.

6. The system of claim 5, wherein the state of the embedded content parameter dictating occurrence of the trigger event includes a change of a value of the embedded content parameter, such that the first trigger event is associated with the first change.

7. The system of claim 5, wherein the state of the embedded content parameter dictating occurrence of the trigger event includes a specific value of the embedded content parameter, such that the first trigger event is associated with the second value.

8. The system of claim 1, wherein the automation information further specifies one or more of the trigger events are derived from the values of the environment parameters.

9. The system of claim 1, wherein the third-party resources includes one or more of a payment application, a social media application, a customer relationship management application, a ticketing application, a partner relationship management application, or a web form application.

10. A method to effectuate sets of automated actions within a collaboration environment based on trigger events derived from third-party content embedded in the collaboration environment, the method comprising:

managing, by a server, environment state information maintaining a collaboration environment, the collaboration environment being configured to facilitate interaction by users with the collaboration environment, the environment state information including values of environment parameters and embedded content parameters, the environment parameters characterizing the users and units of work managed, created, and/or assigned within the collaboration environment, the embedded content parameters characterizing third-party content embedded within the collaboration environment;

obtaining, by the server, the third-party content from third-party resources managed by third-party server, the third-party servers operating outside of the system, the third-party resources including a video conferencing application and a calendar application;

obtaining, by the server and from the calendar application, first information characterizing a calendar view layout of a third-party user interface of the calendar application;

updating, by the server, the values of the embedded content parameters based on the first information;

obtaining, by the server and from the video conferencing application, second information characterizing a video conference interface of the video conferencing application;

updating, by the server, the values of the embedded content parameters based on the second information;

effectuating presentation of a calendar view in a user interface of the collaboration environment, wherein the user interface presents the values of the environment parameters and the values of the embedded content parameters so that the third-party content is displayed within the user interface of the collaboration environment in a same calendar view layout as the calendar view layout of the third-party user interface of the calendar application;

generating automation information based on user entry and/or selection of the automation information into the user interface, the automation information specifying sets of automated actions to carry out within the collaboration environment in response to occurrence of trigger events derived from the third-party content embedded within the collaboration environment, such that the automation information specifies a first set of automated actions to carry out within the collaboration environment in response to a first trigger event derived from the third-party content embedded within the collaboration environment;

detecting occurrence of the trigger events from the third-party content embedded within the collaboration environment based on changes in the values of the embedded content parameters, including detecting an occurrence of the first trigger event based on a first change in a first value of a first embedded content parameter to a second value;

responsive to the detection of the occurrence of the trigger events, effectuating the sets of automated actions within the collaboration environment, including responsive to the detection of the first trigger event, effectuating the first set of automated actions within the collaboration environment; and wherein the third-party content, the first information, and the second information are obtained by the server by performing one or more application programming interface calls to the third-party resources, obtaining responses from the third-party resources, and updating the values of the embedded content parameters based on the responses.

11. The method of claim 10, wherein an automated action is defined by a target component and an action component, the target component identifying an environment parameter to which an action is to be carried out with, and the action component defines instructions to effectuate the action with respect to the environment parameter.

12. The method of claim 10, wherein an automated action is defined by a target component and an action component, the target component identifying an embedded content parameter to which an action is to be carried out with, and the action component defines instructions to effectuate the action with respect to the embedded content parameter.

13. The method of claim 12, further comprising:
in response to effectuating the action with respect to the embedded content parameter, effectuating communication of instructions to an individual third-party resource to update information defining the individual third-party resource based on the action with respect to the embedded content parameter.

14. The method of claim 10, wherein a trigger event is defined by a source component and an event component, the source component identifying an embedded content parameter from which occurrences of the trigger event are derived, and the event component defines a state of the embedded content parameter dictating occurrence of the trigger event.

15. The method of claim 14, wherein the state of the embedded content parameter dictating occurrence of the trigger event includes a change of a value of the embedded content parameter, such that the first trigger event is associated with the first change.

16. The method of claim 14, wherein the state of the embedded content parameter dictating occurrence of the trigger event includes a specific value of the embedded content parameter, such that the first trigger event is associated with the second value.

17. The method of claim 10, wherein the automation information further specifies one or more of the trigger events are derived from the values of the environment parameters.

18. The method of claim 10, wherein the third-party resources includes one or more of a payment application, a social media application, a customer relationship management application, a ticketing application, a partner relationship management application, or a web form application.

* * * * *